United States Patent [19]
Steinbach

[11] Patent Number: 5,106,251
[45] Date of Patent: Apr. 21, 1992

[54] AUTOMATIC LOCKING DEVICE FOR POP OUT HANDLE LOCKS

[75] Inventor: Robert Steinbach, Glendale Heights, Ill.

[73] Assignee: Chicago Lock Company, Chicago, Ill.

[21] Appl. No.: 552,926

[22] Filed: Jul. 16, 1990

[51] Int. Cl.⁵ .............................................. F16B 37/08
[52] U.S. Cl. .................... 411/433; 411/105; 292/251
[58] Field of Search ............ 411/433, 432, 437, 103, 411/105, 108, 267; 292/251

[56] References Cited

U.S. PATENT DOCUMENTS

| | | | |
|---|---|---|---|
| 2,016,826 | 10/1935 | Arnold | 411/354 |
| 2,323,260 | 6/1943 | Venditty | 411/433 X |
| 2,396,142 | 3/1946 | Allen | 411/432 |
| 2,420,733 | 5/1947 | Cannova | 411/105 X |
| 3,093,179 | 6/1963 | Zahodiakin | 411/353 |
| 3,295,578 | 1/1967 | Maloof | 411/105 |
| 4,071,158 | 1/1978 | Maheu | 411/433 X |
| 4,464,091 | 8/1984 | Molina | 411/105 |
| 4,974,888 | 12/1990 | Childers | 411/433 X |

FOREIGN PATENT DOCUMENTS

| | | | |
|---|---|---|---|
| 424825 | 6/1948 | Italy | 411/433 |
| 565669 | 8/1957 | Italy | 411/103 |
| 72788 | 11/1947 | Norway | 411/433 |

Primary Examiner—Rodney M. Lindsey
Attorney, Agent, or Firm—Basil E. Demeur; Robert E. Knechtel; Alan B. Samlan

[57] ABSTRACT

The present invention discloses an automatic locking device for effecting the locking engagement of a lock stud within a stud receiving fixture adapted for locking two complimentary structures together formed by a lock mechanism of the type provided with a lock stud mounted on one of the complimentary structures, the lock stud having a predetermined diametric dimension and threaded along the exposed end thereof, the outer exposed end being terminating in a nose portion which has a diametric dimension slightly in excess of the diametric dimension of the lock stud. A stud receiving locking means is mounted on the opposed complimentary structure and in substantial linear alignment with the lock mechanism. The stud receiving locking means is provided with at least two movable members being normally biasingly urged together and having an apreture formed by the members diametrically sized to be complimentary with the diametric dimension of the lock stud when the members are in the rest position. The stud receiving locking means is provided with internal threads formed along the aperture which are complimentary with the threads on the lock stud, and the nose means being capable of biasingly urging the movable members apart to accommodate the insertion therein of the threaded lock stud until the threaded portion of the lock stud meets the threaded aperture between the movable members. The biasing means then urges the movable members back into their rest position in face to face touching relationship thereby to threadingly engage the aperture threads with the lock stud threads and thereby engage the lock stud to the stud receiving locking means.

2 Claims, 3 Drawing Sheets

AUTOMATIC LOCKING DEVICE FOR POP OUT HANDLE LOCKS

BACKGROUND OF THE INVENTION

The present invention relates to improvements to pop out handle locks of the type typically employed in vending machines, and which are utilized for the purpose of lockingly engaging the door to the main chamber of a vending machine or other such static structure.

Pop out handle locks are well-known, especially in conjunction with vending machines such as pop machines, candy machines and the like, wherein the vending machines are provided with a main chamber in which the goods which are to be vended are contained, and a door which is pivotly secured to the chamber, and which lockingly engages with the chamber As is well-known in the art, the door portion of the vending machine or other structure contains a lock mechanism which includes a pop out handle actuated by an appropriate key, which is exposed along the outer portion of the door. The interior portion of the lock mechanism includes a threaded lock stud which extends outwardly from the inside portion of the door and is typically adapted to be screw threaded into a stud receiving fixture which is fixedly secured to the inside portion of the chamber wherein the pop or candy goods are retained. As is well-known in the art, to unlock such a pop out handle lock, the operator inserts the proper key into a central key way provided in the pop out handle, which actuates the handle to pop outwardly towards the user. The handle is then turned in a counterclockwise direction which unscrews the lock stud from the internal lock fixture. The internal lock fixture includes a fixed nut which accepts and accommodates the threading and unthreading of the lock stud therein.

In order to lock the door to the chamber, the reverse procedure is employed such that the door is closed thereby orienting the threaded lock stud in linear alignment with the threaded nut contained within the lock fixture, and the pop handle then screw threaded in a clockwise direction such that the lock stud threadingly engages the fixed nut located in the locking fixture. Once the lock stud has been fully threadedly engaged within the lock fixture, the handle is depressed until a lock bolt engages maintaining the handle in a depressed position usually within a handle recess located in the door.

Various prior art patents show different versions of such pop out lock handle assemblies, including for example U.S. Pat. No. 3,089,330, which is directed to a lock assembly for a refrigerated cabinet or other such vending machine, and shows the typical pop out handle lock mechanism having the pop out handle at the exterior portion of the lock mechanism, and the threaded lock stud along the internal portion of the lock mechanism. As particularly shown in FIG. 2 of the drawings of U.S. Pat. No. 3,089,330, the lock stud 16 is screw threaded into a fixed cage nut 20 incident to the locking process. It is therefore appreciated that the locking and unlocking process requires that the handle pop out, and that the operator manipulate the handle in order to rotate the lock stud either in a clockwise direction to lock the device, or in a counterclockwise direction to unlock the device.

Other prior art patents show similar types of pop out handle assemblies, such as, for example, U.S. Pat. No. 3,316,742, which shows another version of a pop out handle lock which includes an axially movable clutch mechanism, representing an improvement in such lock assemblies, and as is further shown in U.S. Pat. No. 3,550,412, which again is intended to show certain improvements in and to the lock mechanism. However, in each and every instance with respect to such prior art pop out handle lock mechanisms, the lock stud is intended to be screw threadedly engaged in a fixed cage nut, which is usually fixedly secured within the chamber of the coin mechanism thereby requiring a clockwise threading operation to lock the device, and a counterclockwise threading movement in order to unlock the mechanism.

It has now been deemed advisable to further improve upon pop out handle type lock mechanisms whereby such locking mechanisms may be made automatic in terms of the locking process. The present invention is therefore intended to further improve upon such pop out handle type lock assemblies by providing a lock mechanism which permits the automatic locking engagement of the lock stud to the lock mechanism thereby eliminating the need for the operator to screw thread the lock stud in the clockwise direction in order to effect the locking process.

OBJECTS AND ADVANTAGES

It is therefore the primary object of the present invention to provide an automatic locking device for lockingly engaging a lock stud of the type normally found with pop out handle type lock assemblies, into a stud receiving fixture for locking and engaging two complimentary structures together.

In conjunction with the foregoing object, the object of the present invention is to provide an automatic locking device of the type described which is formed by a lock mechanism of the type provided with a lock stud which is mounted on one of the complimentary structures, the lock stud having a predetermined diametric dimension and having the outer exposed end thereof provided with threads, and having a nose portion at the outer exposed end thereof, the nose portion having a diametric dimension slightly in excess of the diametric dimension of the lock stud, and the opposed complimentary structure having a stud receiving locking means mounted therein and in substantial linear alignment with the lock mechanism contained in the opposed complimentary structure. The stud receiving locking means is provided with at least two movable members being normally biasingly urged together by biasing means and having an aperture formed between the two members, the aperture being dimetrically sized to be complimentary with the diametric dimension of the lock stud when the two movable members are in the rest position. The aperture formed by the two movable members is provided with internal threads which are complimentary with the threads on the lock stud, and the nose means being capable of biasingly urging the movable members apart when the lock stud is moved into contact with and passes through the aperture formed in the movable members. The movable members are biasingly urged back into the rest position when the nose means has passed through the aperture thereby to engage the aperture threads with the lock stud threads and engage the lock stud to the stud receiving locking mechanism.

In conjunction with the foregoing object, it is a further object of the present invention to provide an automatic locking mechanism of the type described wherein the nose means is formed by a frusto-conical nose portion formed at the outer end of the lock stud, the frusto-conical nose portion being integral with the lock stud and being designed to provide an external force for biasingly urging the two movable members of the lock mechanism apart until the threaded aperture formed between the movable members engages the threads formed on the lock stud thereby to lock the parts together.

Still a further object of the present invention is to provide an automatic locking device of the type described wherein the stud receiving locking means formed in the opposed complimentary structure comprises a fixed cage mounted on the complimentary structure, the cage being bounded by opposed side walls, top and bottom walls, and front and rear wall, each of the front and rear walls having a stud receiving aperture formed therein, and a pair of movable members positioned within the cage and being movable therein, the movable members together forming a centrally disposed lock stud receiving aperture therebetween, and being positioned such that the stud receiving aperture of the movable members is in alignment with the apertures formed in the front and rear walls of the cage. The stud receiving aperture of the movable members has threads which are adapted to threadedly engage the threads on the lock stud, and biasing means is associated with the movable members for biasingly urging the movable members together in the normal rest position while permitting the movable members to be biasingly urged apart in response to external pressure, such as by the interposition of the nose portion through the threaded aperture of the movable members.

In conjunction with the foregoing object, it is still a further object of the present invention to provide an automatic locking device as described wherein the biasing means associated with the movable members permits the movable members to spread apart to accommodate the nose portion of the lock stud therethrough, and will be biasingly urged back together by the biasing means thereby to lockingly engage the aperture threads onto the lock stud threads and effect a locking of the lock stud to the locking fixture, which in turn, locks the two complimentary structures together automatically.

BRIEF SUMMARY OF THE INVENTION

In summary, the present invention is intended to improve upon the typical pop out handle lock assemblies of the type which typically provide a threaded lock stud for engagement with a fixed cage nut each of the two portions of the locking mechanism being contained within opposed complimentary structures intended to be locked together. Typically, the present invention will have application in devices such as vending machines, or other chambers having doors which are intended to be locked together in order to protect the contents of the chamber.

The improvement as indicated in conjunction with the present invention is to provide a lock mechanism which permits the automatic locking of the lock stud to the opposed lock mechanism merely by the application of manual pressure. The invention consists of providing a typical pop out handle lock assembly of the type which includes a lock stud extending rearwardly of the lock mechanism, the lock stud being improved with a terminal nose portion having a diametric dimension slightly in excess of the diametric dimension of the lock stud. The stud receiving lock means contained within the opposed complimentary structure is designed to be provided with a fixed cage in which is positioned at least two movable members which are complimentary to one another, and adapted to have a centralized aperture formed between the two movable members. The centralized apertures is provided with threads complimentary to the threads contained on the lock stud. The movable members are provided with biasing means associated therewith which normally cause the two movable members to be biasingly urged together when in the rest position.

In operation, once the nose portion of the lock stud is moved into contact with the movable members such that the nose portion aligns with the centralized aperture formed between the two movable members, the greater diametric dimension of the nose portion will biasingly urge the two movable members apart as the nose portion passes therethrough. Once the nose portion has cleared the centralized aperture between the two movable members, the movable members are normally biasingly urged back together by the biasing means which thereby causes the threaded aperture to engage the threaded lock stud thereby completing the locking mechanism such that the lock stud is now lockingly engaged within the lock mechanism. In this manner, the two complimentary structures are similarly locked together.

If desired, the pop out handle may be further screw threaded in a clockwise direction such that a tight locking engagement as between the two complimentary structures may be effected, however the initial locking engagement is caused automatically by forcing the nose portion of the lock stud through the lock mechanism.

Further features of the present invention pertain to a particular arrangement of the parts whereby the above outlined, and additional operating features are attained.

The invention, both as to its organization and method of operation, together with further objects and advantages thereof, will best be understood by reference to the following specification taken in conjunction with the accompanying drawings.

DETAILED DESCRIPTION OF THE DRAWINGS

Figure 1:
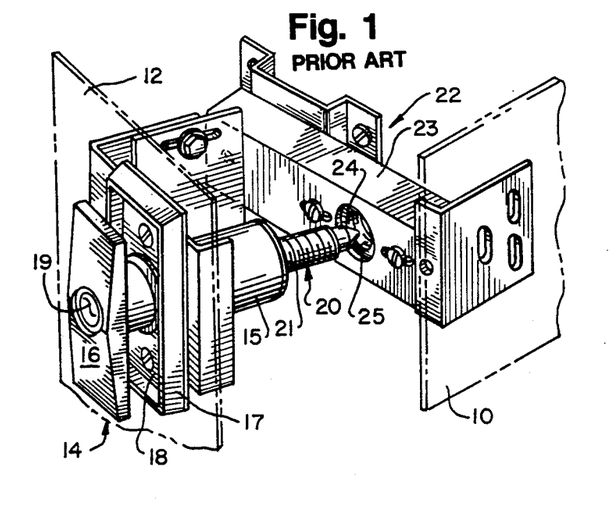
FIG. 1 is a perspective view showing a typical prior art pop out handle type lock assembly and the lock fixture in which the lock stud is accepted for locking purposes.
Figure 2:
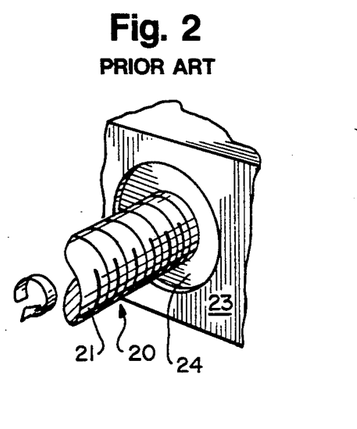
FIG. 2 is a perspective view showing, once again, a typical prior art method of engaging the lock stud to the fixed cage nut wherein the lock stud is screw threaded into the lock nut to effect a locking procedure.

In FIGS. 1 and 2 of the drawings, the typical prior art pop out handle type lock assemblies are illustrated. There is further illustrated the manner in which the lock mechanism, namely the lock stud, engages a fixed cage nut which is contained within the stationary portion of the lock assembly.

As depicted therein a structure intended to be maintained in lock position will usually be formed by a chamber 10, having associated therewith a pivotly secured door 12. The typical application for such locks are vending machines, especially the type intended for vending soda pop, candy and the like. The chamber 12 is usually the housing in which the vended products and the other mechanical portions of the vending machine are contained, which is then closed off by means of a door 12. Hence, in the usual and typical application, it is intended that the door be lockingly engaged to the chamber. The door 12 is provided with a pop out handle lock assembly 14, consisting of a lock assembly contained within a cylinder 15, the forward end of which accommodates the pop out handle 16. The door 12 accommodates a handle housing 17 which is secured thereto, the handle housing 17 including a recess 18 in which the handle 16 may be snugly received. In typical fashion, the handle 16 includes a key way 19 which receives the appropriate key in order to activate the handle in the manner known in the art. The back end of the lock assembly 14 is provided with a threaded lock stud 20 which is typically cylindrical in configuration, and is threaded throughout its substantial length as indicated at 21.

The chamber 10 is provided with a fixed cage 23 which is fixedly mounted to the chamber in a manner well-known in the art. The fixed cage 23 includes a cage nut 24 secured therein which is in turn provided with a central aperture 25 which is threaded as indicated, and as is well-known in the art, accepts therein the screw threading of the threaded lock stud 20.

It is fairly well established in the art that the cage nut 24 is fixedly secured within the fixed cage 23, in order to facilitate the secure locking of the lock stud 20 relative to the fixed cage 23. As indicated previously, FIGS. 1 and 2 are intended to depict the typical prior art pop out lock mechanism and the corresponding stud receiving locking means carried by the complimentary structure to which the door locks.

The manner in which the pop out handle lock assembly 14 is secured to the door 12, and the lock receiving mechanism 22 is secured to the chamber 10 is well-known in the art, and is not construed to form a part of the present invention.

Figure 3:
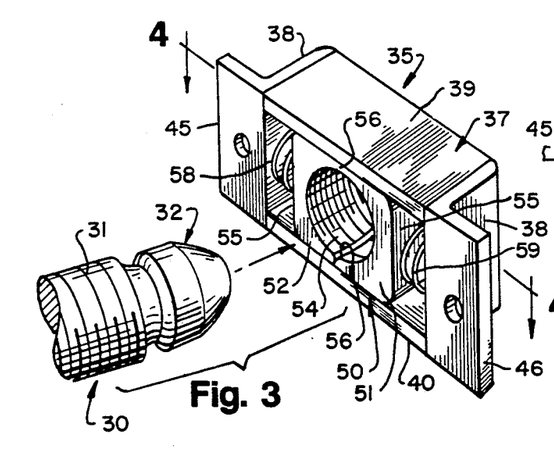
FIG. 3 is a perspective view of the present invention showing the improved lock stud having a nose portion at the outer end thereof and the cage including two movable members for accommodating the automatic locking engagement of the lock stud therein.
Figure 4:
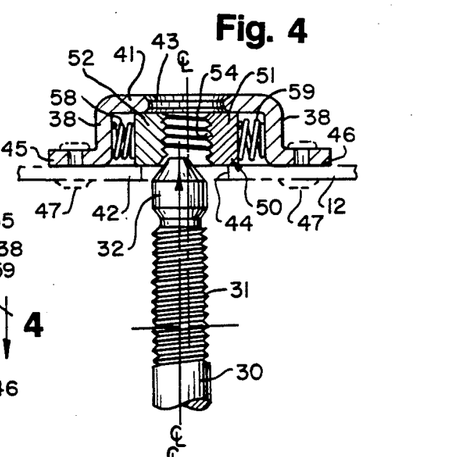
FIG. 4 is a top view, partly in cross section, taken in the direction of the arrow along the line 4—4 in FIG. 3, showing the lock stud being axially aligned into the central aperture formed between the two movable members preliminary to the locking procedure.
Figure 5:
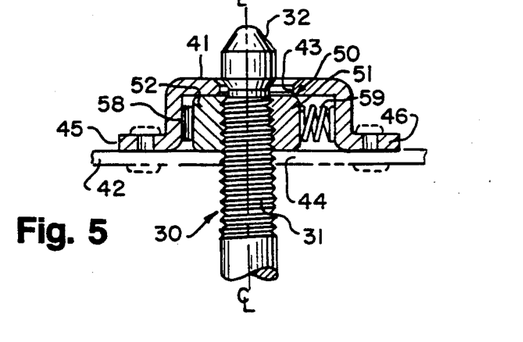
FIG. 5 is a top view, partly in cross section, showing, sequentially, the lock stud moved into locking engagement with the two movable members contained within the fixed cage.

With reference to FIGS. 3, 4 and 5 of the drawings, the preferred embodiment of the present invention is illustrated. It will be observed that the lock stud 30 is similarly provided with threads 31 along virtually the entire length thereof, with the exception that an improved nose portion 32 has now been provided. The diametric dimension of the lock stud 30 is the usual and typical diametric dimension as is presently known in the art. It is contemplated that the nose portion 32 will be integrally formed and form a part of the lock stud 30, and assume a frustoconical configuration as illustrated in FIGS. 3, 4 and 5 of the drawings. Furthermore, the diametric dimension of the nose portion 32 is constructed to be slightly in excess of the diametric dimension of the lock stud 30, as will be more fully discussed hereinafter. It is therefore contemplated that a part of the improvement with respect to the pop out handle lock assembly 14 consists of the improvement to the lock stud 30 by providing a nose portion 32 which is utilized for a purpose to be more fully described hereinafter.

As is further shown in FIGS. 3, 4 and 5 of the drawings, the lock receiving mechanism is that portion of the lock assembly which is fixedly secured to the chamber 10 forming the opposed complimentary structure to which the door is secured. In this embodiment, the lock receiving means 35 is formed by a cage 37 formed by opposed side walls 38, a top wall 39, and a bottom wall 40. The cage 37 is completed by a rear wall 41 and a front wall 42, the rear wall 41 including an aperture 43, and the front wall 42 similarly including an aperture 44. As illustrated in figures 3, 4 and 5 of the drawings, ideally, the cage 37 may be provided with a pair of opposed mounting flanges 45 and 46 respectively to accommodate the mounting of the cage assembly 37 to the chamber 12. As shown in FIGS. 4 and 5 of the drawings, the mounting flanges 45 and 46 may be apertured to accommodate an appropriate mounting bolt 47 therethrough.

As shown in FIGS. 3, 4 and 5 of the drawings, the cage 37 contains the automatic lock members 50, which in this embodiment, are in the format of a split nut having a first threaded nut portion 51, and a second threaded nut portion 52. As depicted in this embodiment, the automatic lock members 50 are in the format of a threaded nut of the type typically known in the hardware art, which has been split into two half sections. Hence, the central portion of the nut has a centrally threaded aperture as indicated at 54, the threads of the threaded aperture 54 being complimentary to the threads 31 of the lock stud 30. Hence, the automatic lock members 50 actually consist of two movable members being the first threaded nut portion 51 and the second threaded nut portion 52, each of which has an outer side edge 55, and an inner edge 56, the threaded central aperture being formed by the cut out portions along the inner side edge of the two complimentary movable members 51 and 52.

It will also be observed that the threaded nut portions 51 and 52 are maintained within the cage 37 in such a fashion such that the same are horizontally movable. It will be observed that interposed between the respective outer side edges 55 of the nut portions 51 and 52, and the interior of the side walls 38, are a pair of opposed coil springs 58 and 59 respectively. As depicted in FIGS. 3 through 5 of the drawings, the nut portions 51 and 52 are horizontally movable within the confines of the cage 37, although the coiled springs 58 and 59 will have a tendancy to normally biasingly urge the two nut portions 51 and 52 into a centrally disposed disposition within the cage 37 (FIG. 4).

As indicated in FIG. 4 of the drawings, the purpose for having the threaded nut portions 51 and 52 being horizontally movable within the cage 37 is to accommodate any axial misalignment of the threaded lock stud 30 relative to the lock members 50 contained within the cage 37.

As particularly shown in FIGS. 4 of the drawings, and as is well-known in the art, often the lock stud 30 is misaligned relative to the aperture 44 contained in the front wall 42 of the cage 37, and the typical prior art lock mechanism will not accurately align the locking aperture contained in the cage nut. The present invention obviates this difficulty by permitting the threaded nut portion 51 and 52 to move horizontally within the confines of the cage 37 so that axial alignment ceases to be a problem, and it is therefore easily overcome. Again as shown in FIG. 4 of the drawings, the lock stud 30 is shown to be slightly axially misaligned relative to the nut portions 51 and 52, however, due to the frusto-conical configuration of the nose portion 32, the nose portion 32 will easily slide into the central aperture 54 between the two threaded nut portions 51 and 52. Indeed, as the pressure caused by the contact of the nose portion 32 with the nut portion 52 occurs, the nut portion 52 will be moved axially to the left as illustrated in FIG. 4 of the drawings, which will also cause the coil spring 59 to put pressure on the other nut portion 51 and move the same axially to the left as well. In this manner, the lock stud 30 will align with the threaded central aperture 54 of the movable members 50.

FIG. 5 of the drawings illustrates the completion of the locking procedure, which occurs once the nose portion 32 has passed fully through the central aperture 54 formed by the automatic lock members 50. As will be appreciated from a serial view of FIGS. 4 and 5 of the drawings, as the nose portion 32 enters through the aperture 44 in the front wall 42 of the cage 37, it will thereafter pass into the threaded central aperture 54 formed between the two threaded nut portions 51 and 52. In view of the fact that the diametric dimension of the nose portion 32 is slightly in excess of the lock stud 30, the two threaded nut portions 51 and 52 will be spread apart. This positioning of the nut portions 51 and 52 will be maintained so long as the nose portion 32 is passing through the central aperture 54. As the nose portion 32 passes out of the threaded central aperture 54, and through the central aperture 43 in the rear wall 41, the action of the coiled springs 58 and 59 respectively will biasingly urge the two nut portions 51 and 52 together, thereby causing the engagement of the threaded central aperture 54 with respect to the threads 31 on the lock stud 30. At the positioning as shown in FIG. 5 of the drawings, the lock stud 30 is actually lockingly secured within the confines of the automatic lock members 50, and the locking process for lockingly engaging the door 12 to the chamber 10 has been accomplished.

If desired, the operator may further rotate the outer handle 16 in a clockwise direction to insure that the resilient gasket which seals a typical refrigerated unit is, in fact, in sealing engagement. Once the lock stud 30 has been engaged within the confines of the lock members 50 as shown in FIG. 5 of the drawings, the pop out handle may simply be depressed until it lockingly engages within the recess 18 of the handle housing 17 (see FIG. 1).

The present invention contemplates that the automatic lock members generally represented by the numeral 50 in FIGS. 3 through 5 of the drawings may be mechanically varied without departing from the spirit and scope of the present invention. For ease of description, like numerals are applied to like structures in the following description.

Figure 6:
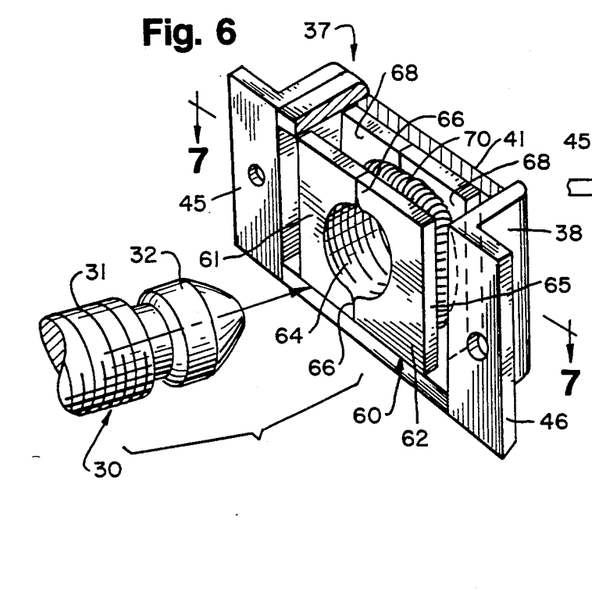
FIG. 6 is a perspective view showing the improved lock stud of the present invention, and an alternate embodiment of two movable members including a biasing spring for maintaining the movable members in face to face relation.
Figure 7:
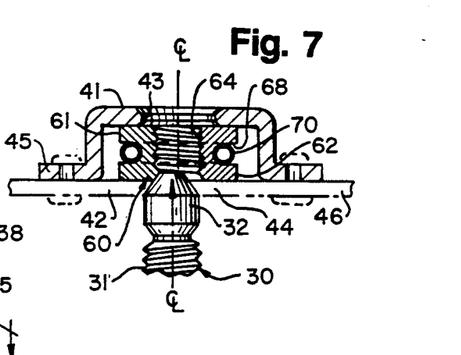
FIG. 7 is a top view, partly in cross section, taken in the direction of the arrows along the line 7—7 in FIG. 6, showing the embodiment as depicted in FIG. 6 of the drawings, and the manner in which the lock stud may be axially aligned with respect to the two movable members incident to the locking procedure.

FIGS. 6 and 7 illustrate an alternate embodiment for the movable members in this embodiment, the cage 37 is again shown to be formed by way of opposed side walls 38, a top wall 39 and a bottom wall 40. A rear wall 41 and front wall 42 are provided, each of which are apertured as shown at 43 and 44 respectively. In this embodiment, the automatic lock members 60 are formed by a first threaded nut portion 61, and a second threaded nut portion 62 as shown therein. Once again, the threaded central aperture 64 is formed by means of the cutout portions along the inner side edge 66 which cooperate together to form the entire threaded central aperture 64.

In this embodiment, the two threaded nut portions 61 and 62 are provided with a circumferential groove 68 around the central periphery of each of the nut portions 61 and 62. A continuous coiled spring 70 is carried in the circumferential groove 68 thereby biasingly urging the two threaded nut portions 61 and 62 together in the normal rest position. It will be appreciated that as the nose portion 32 of the lock stud 30 enters into the threaded central aperture 64, the two threaded nut portions 61 and 62 will be spread apart by the action against the normal biasing tendancies of the coiled spring 70. However, it will further be appreciated that the locking action is similar to that as described with respect to FIGS. 4 and 5 of the drawings. Hence, it will be appreciated that as the nose portion 32 passes through the central aperture 64 maintaining the two nut portions 61 and 62 in the spread apart position, as soon as the nose portion 32 clears the central aperture 64, the two threaded nut portions will be urged together by the action of the continuous coiled spring 70, and in effect will cause a locking position to occur as depicted in FIG. 5 of the drawings.

FIGS. 6 and 7, therefore, represent simply an alternate embodiment for providing a split nut arrangement for the two movable members in order to accomplish the automatic locking feature of the present invention.

Figure 8:
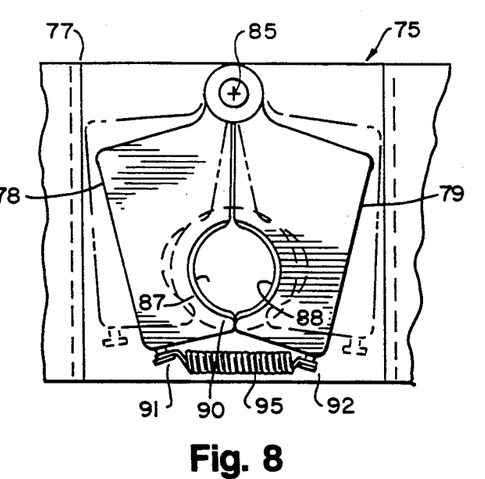
FIG. 8 is a front elevational view, showing still another alternate embodiment of movable members having a centralized aperture formed therebetween for accommodating the lock stud therein in automatic locking fashion.
Figure 9:
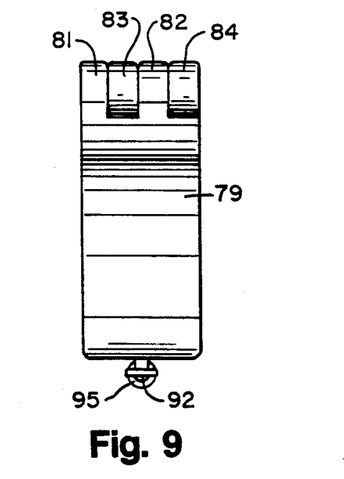
FIG. 9 is a side elevational view showing the manner in which the movable members as depicted in FIG. 8 are pivotally engaged one to the other.

In FIGS. 8 and 9 of the drawings, still another alternate embodiment of the lock receiving means 75 is illustrated. Once again, the lock receiving means 75 is located within a cage 77, constructed in a manner similar to the cage as described hereinabove. In this embodiment, two movable members 78 and 79 are provided, each of the two movable members 78 and 79 including a pair of ears 81 and 82, 83 and 84 respectively which interlock as illustrated in FIG. 9 of the drawings, and are held together by means of a pivot pin 85. The two movable members each have centrally disposed cut out portions 87 and 88 respectively, which together, form a threaded central aperture 90 as shown in FIG. 8 of the drawings. The lower end of the movable members are each provided with a mounting ear 91 and 92 respectively, which accommodate the mounting of a coiled spring 95 therebetween.

As shown in FIG. 8 of the drawings, the movable members 78 and 79 are shown in their rest position in solid lines and in their extended position in phantom. As was indicated with respect to the prior embodiments as described, the coiled spring 95 tends to normally biasingly urge the two movable members 78 and 79 into their rest position as shown in solid lines in FIG. 8, but upon the imposition of the threaded lock stud 30 into the central aperture 90, the nose portion 32 thereof will spread the two movable members 78 and 79 apart, to the position shown in phantom in FIG. 8. Once the nose portion 32 has passed through the central aperture 90, and through the back side of the cage 77, the movable member 78 and 79 will be biasingly urged together and the threaded central aperture 90 will lock onto the threads 31 of the lock stud 30, all in the manner as indicated previously.

Figure 10:
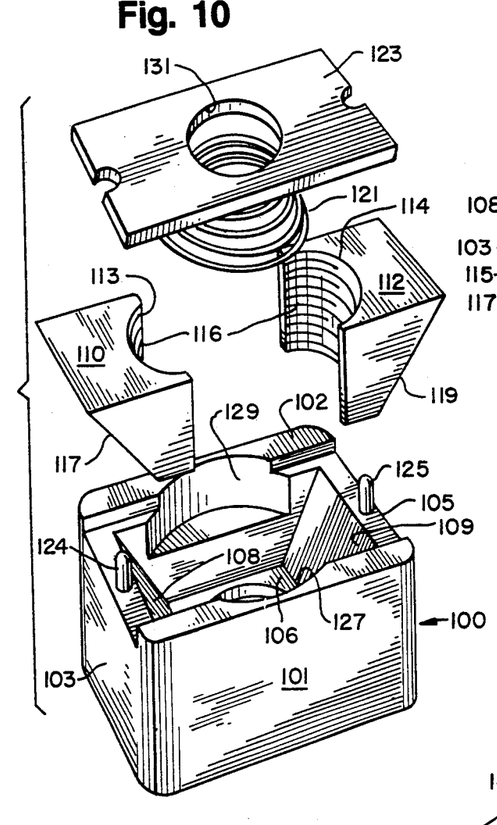
FIG. 10 is a perspective, exploded, view showing still another alternate ebodiment of the lock stud receiving cage containing two movable members in accordance with the concept of the present invention, wherein the cage includes chamfered side walls, and the two movable members are similarly chamfered thereby to be slidably movable within the confines of the cage.
Figure 11:
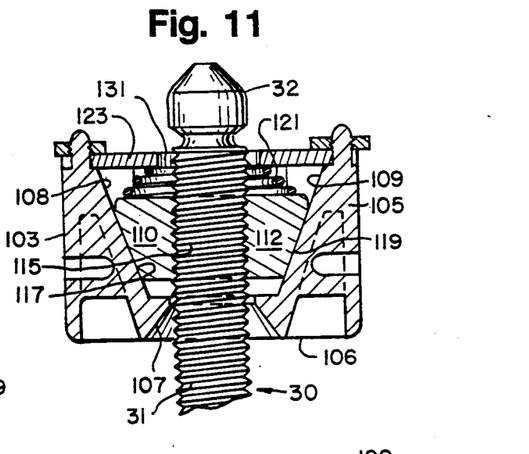
FIG. 11 is a side elevational view, in cross section, showing the manner in which the threaded look stud is received within the confines of the lock stud receiving mechanism, and lockingly engaged by the two movable members contained therein.

With respect to FIGS. 10 and 11 of the drawings, still a further alternate embodiment a fixed cage lock receiving mechanism is illustrated. The improvement which is designed into this embodiment is intended to prevent any unauthorized person from being able to pull the lock stud 30 from the fixed cage mechanism once the locking procedure has been accomplished. With specific reference to FIGS. 10 and 11 of the drawings, it will be observed that the fixed cage 100 is shown to be formed by a top wall and bottom wall, 101 and 102 respectively, a pair of opposed side wall 103 and 105 respectively, and a front wall 106. It will be observed that the interior surfaces of the side walls 103 and 105 respectively are chamfered as indicated at 108 and 109 respectively.

There is provided two movable members 110 and 112 respectively each of which has a circular cut out portion 113 and 114 respectively which together form a central aperture 115. It will be observed that the respective side walls of the two movable members 110 and 112 are chamfered as indicated at 117 and 119 respectively, the chamfers 117 and 119 are matingly cooperating with the chamfers 108 and 109 formed in the side walls 103 and 105 of the cage 100. It will further be observed that the central aperture 115 is provided with threads 116 which are designed to matingly engage the threads 31 on the lock stud 30 in the same manner as previously indicated.

The assembly is completed by a frusto-conical coil spring 121, such that the enlarged portion of the spring 121 seats against the back wall of the movable members 110 and 112 respectively, and held in position by a back plate 123 which may be secured to the cage 100 by means of locking pins 124 and 125 respectively. The front wall 106 is also shown to include a frusto-conical entrance aperture 107 (see FIG. 11) which is intended to align the nose portion 32 of the lock stud 30 incident to the initial locking procedure. It will also be observed that the cage 100 is constructed such that each of the top wall 101 and bottom wall 102 has a spring seat 127 and 129 formed therein to accommodate the positioning of the coil spring 121 therein. The back plate 123 is apertured as indicated at 131 in order to allow the nose portion 32 of the lock stud 30 to pass therethrough.

It will be appreciated from a view of FIG. 11 that the locking procedure is accomplished much in the same manner as heretofore described with respect to FIGS. 3 through 5, and FIGS. 6 through 9. As illustrated therein, the lock stud 30, which is a part of the lock mechanism usually contained in the door portion of the vending device, will have the nose portion 32 thereof enter through the frusto-conical entrance aperture 107 of the front wall 106, which aligns the lock stud 30 with respect to the lock receiving mechanism. It will therefore be appreciated that the nose portion 32 of the stud 30 will enter through the central aperture 115 as contained between the two movable members 110 and 112 and will force two movable members 110 and 112 to slide rearwardly toward the back plate 123 during the beginning phases of locking procedure. Hence, the two movable members 110 and 112 will be biasingly pressed against the action of the coil spring 121 spreading the two movable members 110 and 112 apart. The nose portion 32 will continue on through the central aperture 115 and ultimately pass through the aperture 131 in the back plate 123. At that point, the threads 116 as between the two movable members 110 and 112 will engage the threads 31 on the lock stud 30, thereby to complete the locking procedure.

It will be appreciated that by having corresponding chamfered walls 108 and 109 with respect to the fixed cage 100, and the outside sidewalls of the movable members 110 and 112 similarly chamfered as indicated at 117 and 119, the two movable members 110 and 112 will easily slide rearwardly toward the back plate 123. Furthermore, once the locking procedure has been completed, any attempt by an unathorized person to pull forwardly on the pop-out handle portion of the lock mechanism seeking to disengage the locks will simply cause the two movable members 110 and 112 to be pulled forwardly toward the front wall 106 of the fixed cage 100 thereby causing the threads 116 of the two movable members 110 and 112 to more firmly grip the threads 31 on the lock stud 30, thereby causing even a more positive locking engagement to occur. It is therefore contemplated that the embodiment as illustrated in FIGS. 10 and 11 is an even more positive locking mechanism for such automatic locking mechanism since any attempt to withdraw the lock stud 30 from the movable members contained within the fixed cage will be met with increased resistance.

Figure 12:
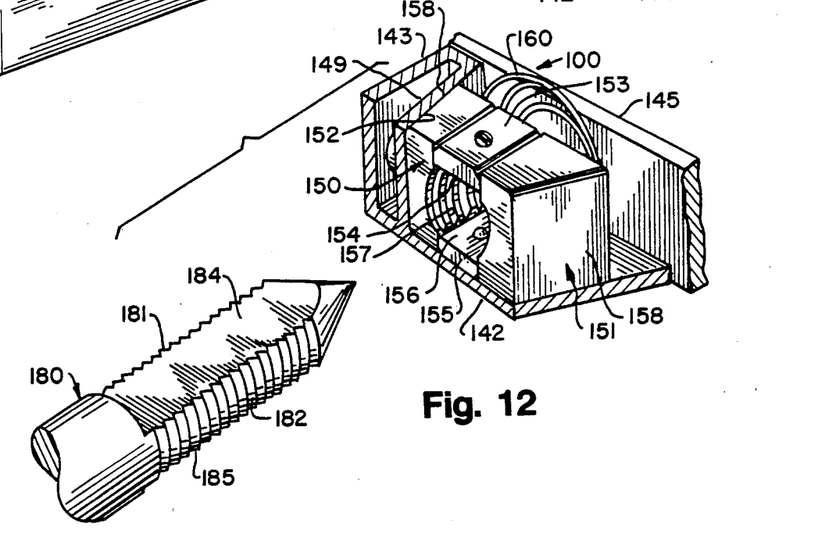
FIG. 12 is a front perspective view, partly in cross section, showing still another alternate embodiment of a lock stud and lock stud receiving cage unit having two movable members and the means by which the lock stud may be automatically lockingly engaged therein, by means of a 90 degree half turn of the lock stud.

FIG. 12 illustrates still another proposed embodiment for a locking mechanism of the type heretofore described in order to accommodate an automatic locking procedure for lockingly engaging a door to a chamber. The construction of this embodiment as illustrated in FIG. 12, is similar to that described with respect to FIGS. 10 and 11, insofar as the construction of the cage 100 is concerned, although the construction of the movable members within the cage 100 have been varied somewhat as will be more fully described hereinbelow.

Figure 12A:
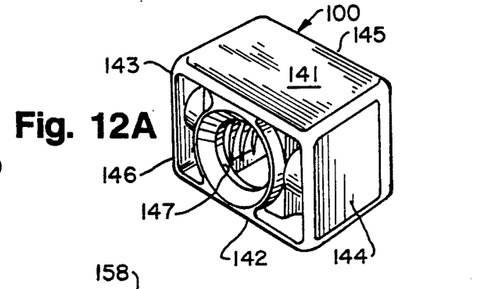
FIG. 12a is a perspective view of the cage in which the lock stud receiving locking means is positioned, which is mounted within the complementary structure for receiving the threaded lock stud, as more particularly shown in FIG. 12.

As illustrated in FIGS. 12 and 12a, the fixed cage 100 is shown to be formed by a top wall 141, bottom wall 142, opposed side walls 143 and 144 respectively, and a back wall 144. The front wall 146 is provided with a central aperture 147 which accommodates the insertion therein of the lock stud 180.

It will be noted that in this embodiment, the movable members 150 and 151 respectively are held in a spaced apart relationship by means of upper and lower spacers 153 and 155 respectively. Each of the upper and lower spaces 153 and 155 include an interior flat surface as depicted at 154 and 156 respectively. As shown with respect to the prior embodiments, the movable members 150 and 151 include interior threads 157 which, in this embodiment, are positioned in opposed horizontal alignment and further, it is noted the upper and lower spacers 153 and 155 respectively contain no threads. In this embodiment, it is contemplated that the locking procedure is simplified, once again, by accommodating a 90 degree turn of the lock stud 180 once inserted into the central aperture 147.

It will also be observed that the cage 100 is provided with an interior wall 149 which is chamfered as indicated at 152 in the same manner as the walls of the cage 100 as depicted in FIG. 11. Similarly, the exterior side walls of the movable members 150 and 151 are chamfered as indicated at 158 so that there is a positive gripping relationship as between the movable members 150, 151, and the interior side walls 149 of the cage 100, all as previously described. The cage assembly is completed by means of coil spring 160 which functions to normally biasingly urge the movable members 150 and 151 forwardly toward the front wall 146 of the cage 100, again as described with respect to prior embodiments.

As shown in FIG. 12, the lock stud 180 is shown to have a slightly different configuration for purposes of accomplishing the automatic locking feature of the present invention. It will be noted that the elongated interior end of the lock stud 180 includes oppositely disposed threads 181 and 182 respectively, which are separated by an upper flat 184, and a lower flat 185. In this embodiment, the enlarged nose portion (not shown) may be included as a part of the lock stud, or as an alternate, may be eliminated as shown in FIG. 12 of the drawings. It will be appreciated that the lock stud 180 will operate with respect to the cage unit 100 when the lock stud 180 is positioned with the flats 184 and 185 in alignment with the upper and lower spacers 153 and 155 respectively. In this position, when the lock stud 180 is inserted in through the central aperture 147 between the movable members 150 and 151, the threads 181 and 182 of the lock stud 180 will engage the threads 157 of the movable members 150 and 151 to accomplish the locking feature. To unlock the device, the lock stud 180 would simply be turned 90 degrees such that the flats 181 and 182 are placed into alignment with the threads 157 of the movable members 150 and 151. In this position, the interior threads 157 of the movable members 150 and 151 are not able to engage the threads 181 and 182 of the lock stud 180, such that the lock stud 180 may now be removed from the central aperture 147.

The embodiment as depicted in FIG. 12 is intended to again simplify the automatic locking procedure of the present invention by providing a lock stud 180 which may be unlocked by a simple 90 degree turn of the lock stud 180. It will be appreciated, however, that with this embodiment, the lock stud 180 is not capable of being further screw threaded into the central aperture 147 by the clockwise rotation of the lock stud 180 because of the flats 184 and 185 respectively. However, the embodiment as shown in FIG. 12 will provide an automatic locking feature for lockingly engaging two complimentary structures within the spirit and scope of the present invention.

It will be appreciated that the movable members may take the form of several different mechanical embodiments, however, in accordance with the present invention, it is intended that the typical fixed cage nut for accepting a threaded lock stud therein as is known in the prior art is modified to provide a movable split nut arrangement wherein the nut actually consists of two movable members trapped within a cage, but capable of horizontal movement, and some degree of vertical movement. In addition, the lock stud is modified by providing a nose portion consisting of a frusto-conical section, which, mechanically, functions to spread the two movable members apart as the lock stud is axially aligned with the lock receiving means. Furthermore, by permitting some degree of horizontal as well as vertical movement of the two movable members within the cage, any slight misalignment of the lock stud in aligning with the lock receiving means which is common in the field, will be accommodated, and the nose portion of the lock stud will linearly align with the threaded aperture of the movable members incident to the automatic locking process.

As was previously indicated, such misalignment can occur as shown in FIG. 4 of the drawings, wherein it is indicated that the lock stud 30 is slightly linearly misaligned with respect to the lock receiving means. Hence, since the movable members are permitted horizontal as well as vertical movement within the cage, any such misalignment will be accommodated and still permit the closing of the two complimentary structures consisting of the door to the chamber.

It will further be appreciated that the modified version of the lock receiving means and lock stud as described herein does not require any major modification to either the door or the chamber upon which such units are now mounted. The cage and the lock receiving means disclosed herein may be easily constructed and incorporated into existing structures, and further, a lock stud provided with an integrally formed frusto-conical nose portion may easily be manufactured such that the entire assembly as described and claimed herein may be easily and efficiently incorporated in the existing structures and equipment in the field.

It is therefore clear from the description set forth hereinabove, that the present invention now provides an automatic closing device for lockingly engaging closures such as a door with a chamber, or other such compartments wherein pop out type lock handles are presently utilized for locking such devices. Hence, the locking mechanism of the present invention eliminates the need for the operator to screw threadedly lockingly engage the lock stud to the lock receiving means and hence, simplifies the locking process.

While there has been described what is at present considered to be the preferred embodiments of the invention, it will be understood that various modifications may be made therein and it is intended to cover in the appended claims all such modifications as fall within the true spirit and scope of the invention.

I claim:

1. An automatic locking device for automatically locking and unlocking a movable closure member relative to a stationary member such as a vending machine door and cabinet respectively, comprising:

a lock mechanism of the type provided with a lock stud mounted on the movable closure member and having a horizontal axis and a predetermined diametric dimension, said lock stud having an anterior end with a lock handle secured thereto and a posterior end formed into a nose portion, said lock stud further provided with thread portions formed along the posterior end and along opposed sides thereof and positioned adjacent to the nose portion thereof, said thread portions being separated by stud flat portions interposed between and separating said thread portions, stud receiving locking means mounted on the stationary member and in substantial linear alignment with said lock stud mounted on the movable closure member, said stud receiving locking means formed by a fixed cage, said fixed cage containing at least two movable members positioned therein and being normally biasingly urged together by biasing means, said movable members together having a central aperture formed therein, said aperture being sized to be diametrically complimentary with the diametric dimension of said lock stud and being positioned to accommodate the insertion therein of said lock stud incident to the locking procedure, said aperture further provided with thread portions positioned in opposed relation to one another and separated by upper and lower flat spacers, said upper and lower flat spacers and thread portions together being diametrically sized to be complimentary with said thread portions and stud flat portions formed on said lock stud, whereby said lock stud may be lockingly engaged in said stud receiving means by inserting said lock stud into said aperture formed by said movable members with the thread portions of said lock stud being in alignment with said thread portions formed in said aperture such that said movable members move apart in response to the force exerted by said lock stud entering said aperture and retract to arrest and grasp said lock stud to lockingly engage same therein, and automatically unlock said lock stud therefrom by rotating said lock stud through an arc of 90 degrees until said thread portions of said lock stud are in alignment with said upper and lower flat spacers in said aperture thereby disengaging said thread portions of said lock stud from said thread portions of said aperture and permitting unobstructed withdrawal of said lock stud from said stud receiving means.

2. The automatic locking device as set forth in claim 1 above, wherein said cage includes a pair of opposed side walls, each of said side walls being chamfered from rear to front, said movable members including opposed outer side walls, said outer side walls of said movable members being chamfered from rear to front to matingly engage said chamfered side walls of said cage, whereby the forward movement of said movable members within the confines of said cage forces said movable members into tight face to face relation thereby to positively grip said lock stud when engaged within said aperture of said movable members and prevents said lock stud from being withdrawn therefrom by the application of a forward force.

* * * * *